US011620569B2

(12) United States Patent
Gambetta et al.

(10) Patent No.: US 11,620,569 B2
(45) Date of Patent: Apr. 4, 2023

(54) MACHINE LEARNING QUANTUM ALGORITHM VALIDATOR

(71) Applicant: International Business Machines Corporation, Armonk, NY (US)

(72) Inventors: Jay M. Gambetta, Yorktown Heights, NY (US); Ismael Faro Sertage, Chappaqua, NY (US); Francisco Jose Martin Fernandez, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1013 days.

(21) Appl. No.: 16/395,743

(22) Filed: Apr. 26, 2019

(65) Prior Publication Data
US 2020/0342347 A1    Oct. 29, 2020

(51) Int. Cl.
*G06N 10/00*    (2022.01)
*G06N 20/00*    (2019.01)
*G06N 5/046*    (2023.01)

(52) U.S. Cl.
CPC .......... *G06N 20/00* (2019.01); *G06N 5/046* (2013.01); *G06N 10/00* (2019.01)

(58) Field of Classification Search
CPC ......... G06N 20/00; G06N 10/00; G06N 5/046
See application file for complete search history.

(56) References Cited

U.S. PATENT DOCUMENTS

| 7,346,902 | B2 | 3/2008 | Dutt et al. | |
| 10,127,499 | B1 | 11/2018 | Rigetti et al. | |
| 10,325,218 | B1* | 6/2019 | Zeng | G06N 10/00 |
| 2007/0294070 | A1 | 12/2007 | Yamashita | |
| 2017/0147303 | A1* | 5/2017 | Amy | G06F 8/436 |
| 2018/0096085 | A1* | 4/2018 | Rubin | G16C 10/00 |
| 2018/0308000 | A1 | 10/2018 | Dukatz et al. | |
| 2019/0019101 | A1 | 3/2019 | Dutt et al. | |
| 2020/0117764 | A1* | 4/2020 | Zuccarelli | G06F 30/20 |

FOREIGN PATENT DOCUMENTS

| WO | 2003056512 A1 | 7/2003 |
| WO | 2006061926 A1 | 6/2006 |

OTHER PUBLICATIONS

Maslov et al., Quantum Circuit Simplification and Level Compaction, IEEE Transactions on Computer-Aided Design of Integrated Circuits and Systems, 27(3):436-444, Mar. 2008. (Year: 2008).*

(Continued)

*Primary Examiner* — Kamran Afshar
*Assistant Examiner* — Marshall L Werner
(74) *Attorney, Agent, or Firm* — Garg Law Firm, PLLC; Rakesh Garg; Erik Johnson

(57) ABSTRACT

The illustrative embodiments provide a method, system, and computer program product for validating quantum algorithms using a machine learning model. In an embodiment, a method includes receiving a training data set. In an embodiment, a method includes training, by a first processor, a machine learning model with the training data set for validation of quantum circuits. In an embodiment, a method includes generating, by the machine learning model, a set of rules for validation of quantum circuits.

18 Claims, 7 Drawing Sheets

(56) References Cited

OTHER PUBLICATIONS

Sirichi et al., Qubit Allocation, CGO '18, Feb. 2018. (Year: 2018).*
Hentschel et al., "Machine learning for precise quantum measurement" Physical review letters, Feb. 25, 2010.
Wiebe et al., "Hamiltonian learning and certification using quantum resources," Physical review letters (2014).

* cited by examiner

MACHINE LEARNING QUANTUM ALGORITHM VALIDATOR

TECHNICAL FIELD

The present invention relates generally to quantum algorithm validation using machine learning. More particularly, the present invention relates to a system and method for a machine learning quantum algorithm validator.

BACKGROUND

A neural network is an artificial neural network (ANN) modeled after the functioning of the human brain, with weighted connections among its nodes, or "neurons." A deep neural network (DNN) is an artificial neural network with multiple "hidden" layers between its input and output layers. The hidden layers of a DNN allow it to model complex nonlinear relationships featuring higher abstract representations of data, with each hidden layer determining a nonlinear transformation of a prior layer.

The neural network model is typically trained through numerous iterations over vast amounts of data. As a result, training a DNN can be very time-consuming and computationally expensive. For example, in training DNNs to correctly identify faces, thousands of photographs of faces (of people, animals, famous faces, and so on) are input into the system. This is the training data. The DNN processes each photograph using weights from the hidden layers, comparing the training output against the desired output. A goal is that the training output matches the desired output, e.g., for the neural network to correctly identify each photo (facial recognition).

When the error rate is sufficiently small (e.g., the desired level of matching occurs), the neural network can be said to have reached "convergence." In some situations, convergence means that the training error is zero, while in other situations, convergence can be said to have been reached when the training error is within an acceptable threshold. The system begins with a high error rate, as high as 100% in some cases. Errors (e.g., incorrect identifications) get propagated back for further processing, often through multiple iterations, with the system continually updating the weights. The number of iterations increases with the sample size, with neural networks today running in excess of 100,000 iterations.

Hereinafter, a "Q" prefix in a word of phrase is indicative of a reference of that word or phrase in a quantum computing context unless expressly distinguished where used.

Molecules and subatomic particles follow the laws of quantum mechanics, a branch of physics that explores how the physical world works at the most fundamental levels. At this level, particles behave in strange ways, taking on more than one state at the same time, and interacting with other particles that are very far away. Quantum computing harnesses these quantum phenomena to process information.

The computers we commonly use today are known as classical computers (also referred to herein as "conventional" computers or conventional nodes, or "CN"). A conventional computer uses a conventional processor fabricated using semiconductor materials and technology, a semiconductor memory, and a magnetic or solid-state storage device, in what is known as a Von Neumann architecture. Particularly, the processors in conventional computers are binary processors, i.e., operating on binary data represented by 1 and 0.

A quantum processor (q-processor) uses the unique nature of entangled qubit devices (compactly referred to herein as "qubit," plural "qubits") to perform computational tasks. In the particular realms where quantum mechanics operates, particles of matter can exist in multiple states—such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing.

Conventional computers encode information in bits. Each bit can take the value of 1 or 0. These is and Os act as on/off switches that ultimately drive computer functions. Quantum computers, on the other hand, are based on qubits, which operate according to two key principles of quantum physics: superposition and entanglement. Superposition means that each qubit can represent both a 1 and a 0 inference between possible outcomes for an event. Entanglement means that qubits in a superposition can be correlated with each other in a non-classical way; that is, the state of one (whether it is a 1 or a 0 or both) can depend on the state of another, and that there is more information contained within the two qubits when they are entangled than as two individual qubits.

Using these two principles, qubits operate as processors of information, enabling quantum computers to function in ways that allow them to solve certain difficult problems that are intractable using conventional computers.

In conventional circuits, Boolean logic gates arranged in succession manipulate a series of bits. The technology for optimizing the gate-logic for binary computations is well-known. Circuit optimization software for conventional circuits aims to increase efficiency and decrease complexity of conventional circuits. Circuit optimization software for conventional circuits functions in part by decomposing the overall desired behavior of the conventional circuit into simpler functions. The conventional circuit optimization software more easily manipulates and processes the simpler functions. The circuit optimization software generates an efficient layout of design elements on the conventional circuit. As a result, circuit optimization software for conventional circuits significantly reduces resource demands, thereby increasing efficiency and decreasing complexity.

The illustrative embodiments recognize that in quantum circuits, quantum gates manipulate qubits to perform quantum computations. Quantum gates are unitary matrix transformations acting on qubits. Due to the superposition and entanglement of qubits, quantum gates represent a $2^n$ by $2^n$ matrix, where n is the number of qubits the quantum gate manipulates. The illustrative embodiments recognize that the decomposition of such matrix transformations quickly becomes too complex to perform by hand due to the exponential increase in the size of the matrix transformations with the number of qubits. For example, quantum computers with 2 qubits require a 4 by 4 matrix operator for quantum gate representation. A quantum computer with 10 qubits require a 1024 by 1024 matrix operator for quantum gate representation. As a result of the exponential increase, manual quantum logic gate matrix transformations quickly become unmanageable as the number of qubits increases.

Circuit optimization for quantum circuits depends on the chosen function, resource requirements, and other design criteria for the quantum circuit. For instance, quantum circuits are often optimized to work with a specific device. Therefore, there is a need for improved methods for compilation methods of quantum circuits.

A quantum algorithm represents a set of instructions to be performed on a quantum computer. The illustrative embodiments recognize that quantum algorithms can be modeled as a quantum circuit. A quantum circuit is a computation model formed of a set of quantum logic gates which perform the steps of the corresponding quantum algorithm.

The illustrative embodiments recognize that quantum processors exhibit varying physical characteristics over a period of time. The illustrative embodiments recognize that calibration of quantum processors determines error rates for associated qubits and quantum gates of the quantum processor. The illustrative embodiments further recognize that quantum processors are often calibrated only once or twice daily.

The illustrative embodiments recognize that quantum algorithms can contain errors. The illustrative embodiments further recognize that validation of quantum algorithms can assist in determining whether a quantum algorithm will execute on a quantum computer. The illustrative embodiments further recognize that commonly occurring errors in quantum algorithms can be used to validate a quantum algorithm before execution on a quantum computer.

SUMMARY

The illustrative embodiments provide a method, system, and computer program product for validating quantum algorithms using a machine learning model. In an embodiment, a method includes receiving a training data set. In an embodiment, a method includes training, by a first processor, a machine learning model with the training data set for validation of quantum circuits. In an embodiment, a method includes generating, by the machine learning model, a set of rules for validation of quantum circuits.

In an embodiment, a method includes transforming an input quantum algorithm into a set of quantum circuits, a quantum circuit of the set of quantum circuits including a set of quantum gates. In an embodiment, a method includes analyzing a quantum processor to determine an initial state of the quantum processor. In an embodiment, a method includes validating, by the first processor, the quantum circuit by applying a first rule of the set of rules to the quantum circuit.

In an embodiment, a method includes revalidating, by the first processor, the quantum circuit by applying a second rule of the set of rules to the quantum circuit. In an embodiment, a method includes executing, responsive to the validation succeeding, the quantum circuit on the quantum processor. In an embodiment, a method includes executing, responsive to the validation and the revalidation succeeding, the quantum circuit on the quantum processor.

In an embodiment, a method includes updating, responsive to executing failing, the training data set with the quantum circuit. In an embodiment, a method includes retraining, by the first processor, the machine learning model with the updated training data set.

In an embodiment, the first rule is a rule excluding a type of quantum gates for execution on the quantum processor. In an embodiment, the first processor is a classical processor. In an embodiment, a method includes notifying, responsive to the validation failing, a user of the reason for failure and the corresponding quantum circuit.

In an embodiment, the method is embodied in a computer program product comprising one or more computer-readable storage devices and computer-readable program instructions which are stored on the one or more computer-readable tangible storage devices and executed by one or more processors.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

In an embodiment, the program instructions are stored in a computer readable storage device in a data processing system, and wherein the program instructions are transferred over a network from a remote data processing system.

In an embodiment, the program instructions are stored in a computer readable storage device in a server data processing system, and wherein the program instructions are downloaded over a network to a remote data processing system for use in a computer readable storage device associated with the remote data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments used to describe the invention generally address and solve the above-described problem of solving computational problems using quantum computing. The illustrative embodiments provide a method and system for a machine learning quantum algorithm validator.

For the clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for machine learning quantum algorithm validation using a variety of components that can be purposed or repurposed to provide a described function within a data processing environment, and such adaptations are contemplated within the scope of the illustrative embodiments.

The illustrative embodiments are described with respect to certain types of steps, applications, classical processors, quantum processors, quantum states, machine learning models, and data processing environments only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
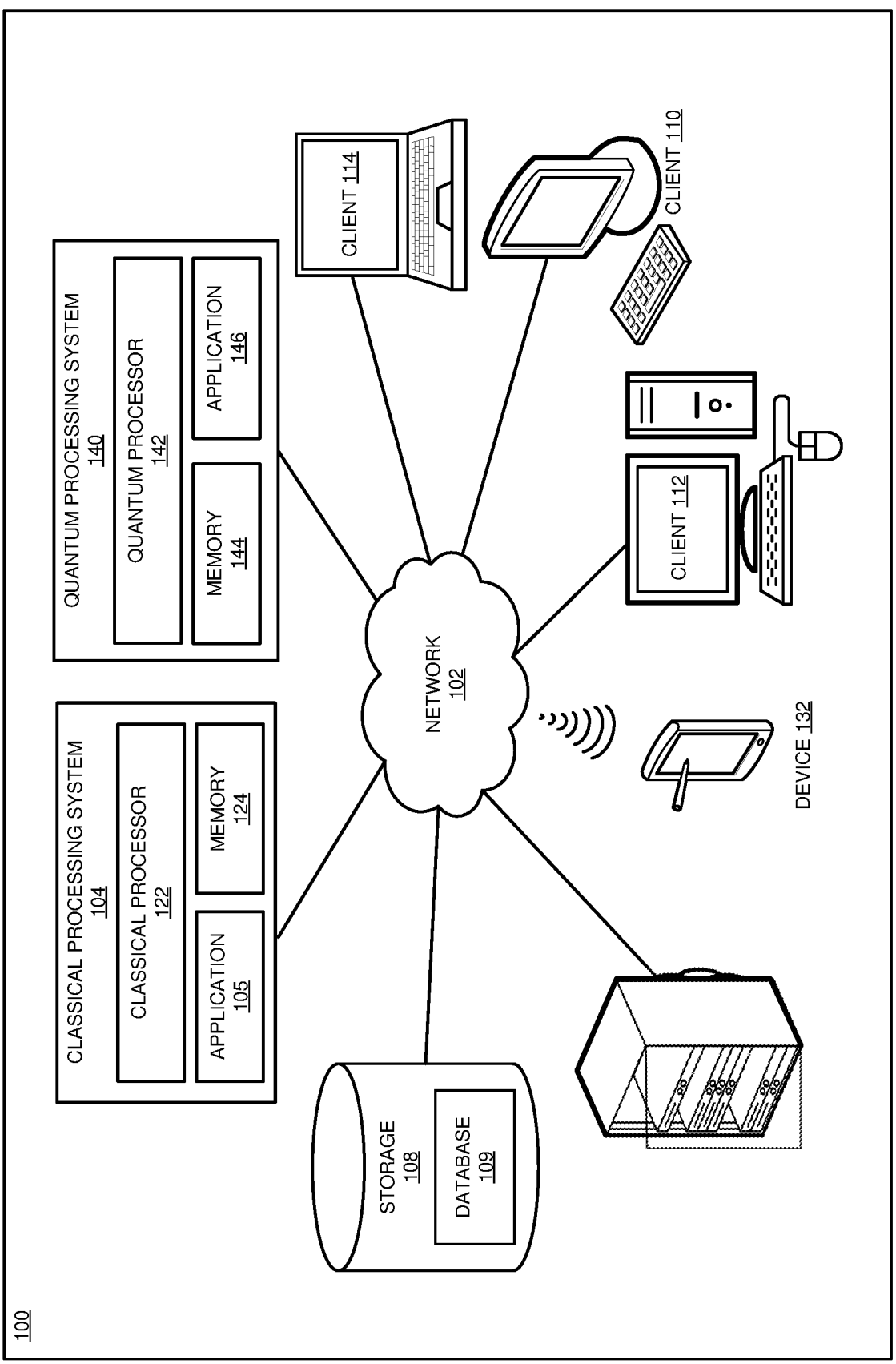
FIG. 1 depicts a block diagram of a network of data processing systems in which illustrative embodiments may be implemented.
Figure 2:
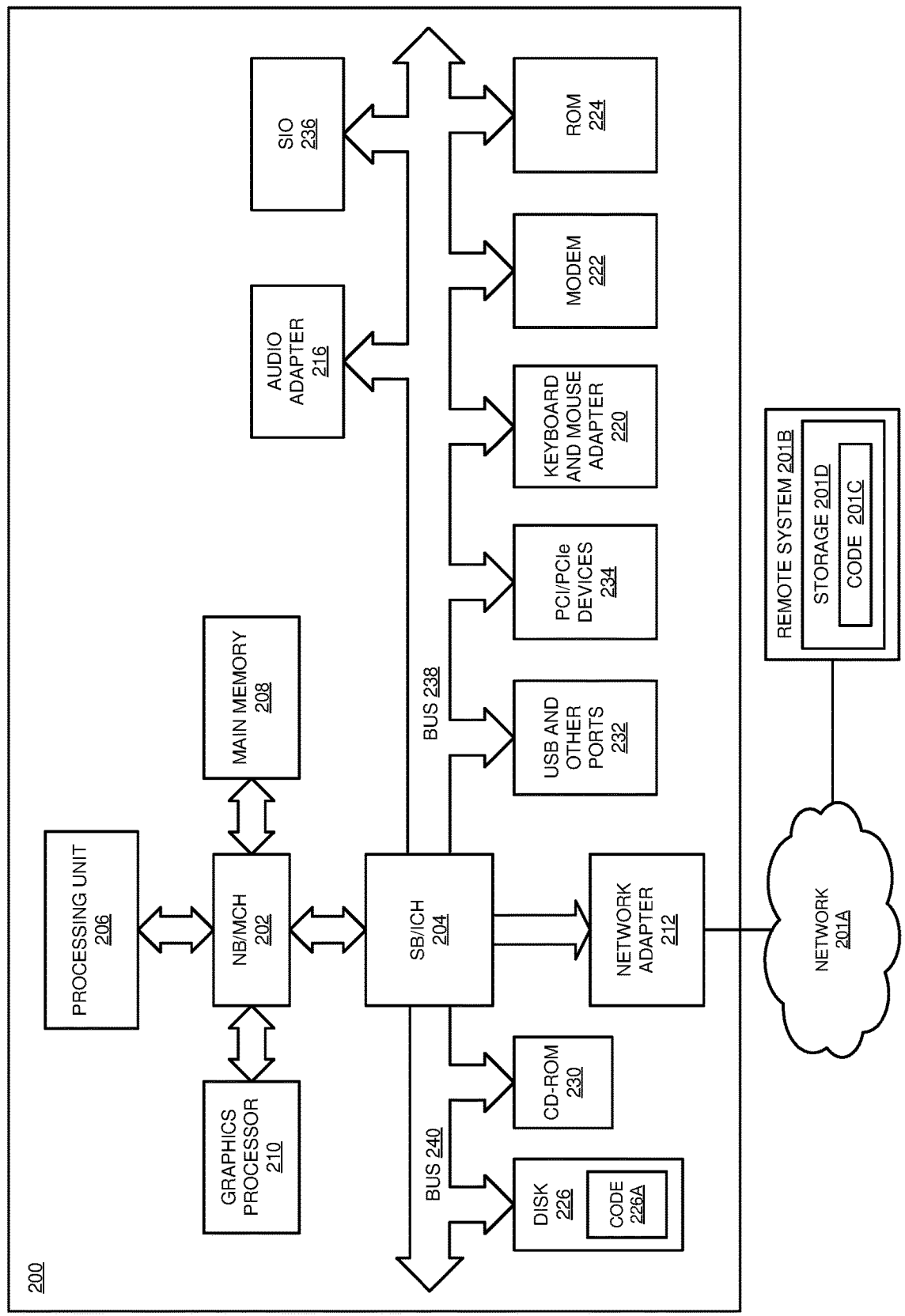
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Classical processing system 104 couples to network 102. Classical processing system 104 is a classical processing system. Software applications may execute on any quantum data processing system in data processing environment 100. Any software application described as executing in classical processing system 104 in FIG. 1 can be configured to execute in another data processing system in a similar manner. Any data or information stored or produced in classical processing system 104 in FIG. 1 can be configured to be stored or produced in another data processing system in a similar manner. A classical data processing system, such as classical processing system 104, may contain data and may have software applications or software tools executing classical computing processes thereon.

Server 106 couples to network 102 along with storage unit 108. Storage unit 108 includes a database 109 configured to store quantum circuit designs, quantum gate parameters, quantum algorithms, and qubit parameters. Server 106 is a conventional data processing system. Quantum processing system 140 couples to network 102. Quantum processing system 140 is a quantum data processing system. Software applications may execute on any quantum data processing system in data processing environment 100. Any software application described as executing in quantum processing system 140 in FIG. 1 can be configured to execute in another quantum data processing system in a similar manner. Any data or information stored or produced in quantum processing system 140 in FIG. 1 can be configured to be stored or produced in another quantum data processing system in a similar manner. A quantum data processing system, such as quantum processing system 140, may contain data and may have software applications or software tools executing quantum computing processes thereon.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several conventional data processing systems, quantum data processing systems, and a data network as shown, whereas another embodiment can be implemented on a single conventional data processing system or single quantum data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, classical processing system 104, quantum processing system 140, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to classical processor 122. Classical processor 122 may include its own data, boot files, operating system images, and applications. Data processing environment 100 may include additional memories, quantum processors, and other devices that are not shown. Memory 124 includes application 105 that may be configured to implement one or more of the classical processor functions described herein for validating quantum algorithms in accordance with one or more embodiments.

In the depicted example, memory 144 may provide data, such as boot files, operating system images, and applications to quantum processor 142. Quantum processor 142 may include its own data, boot files, operating system images, and applications. Data processing environment 100 may include additional memories, quantum processors, and other devices that are not shown. Memory 144 includes application 146 that may be configured to implement one or more of the quantum processor functions described herein in accordance with one or more embodiments.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as classical processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
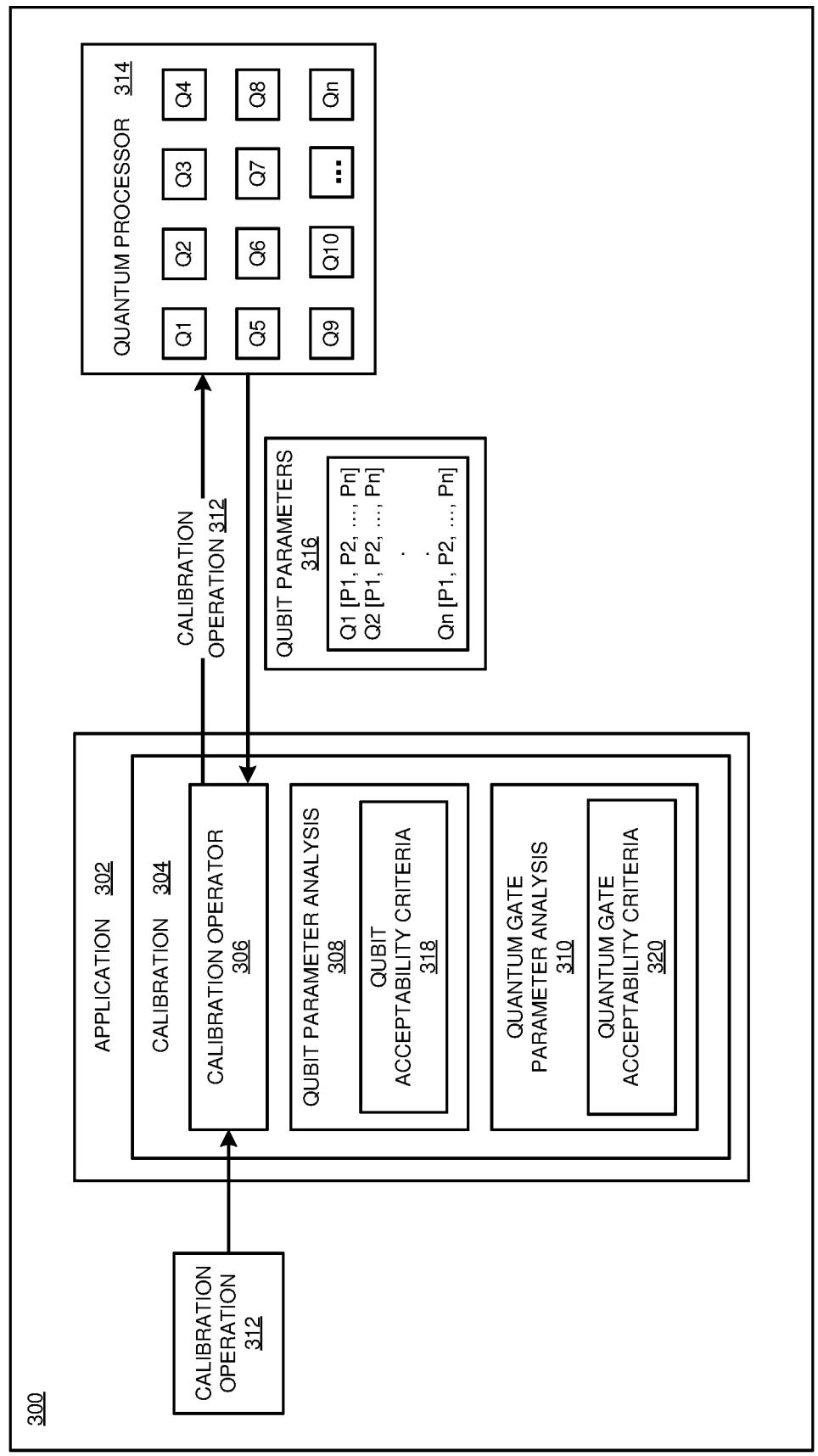
FIG. 3 depicts an example configuration for calibration of a quantum processor in accordance with an illustrative embodiment.

With reference to FIG. 3, this figure depicts an example configuration for calibration of a quantum processor in accordance with an illustrative embodiment. The example embodiment includes an application 302. In a particular embodiment, application 302 is an example of application 105 in FIG. 1.

Application 302 includes calibration component 304. Component 304 includes calibration operator component 306, qubit parameter analysis component 308, and quantum gate parameter analysis component 310. Application 302 receives a calibration operation 312.

Calibration operator 306 executes calibration operation 312. In an embodiment, calibration operation 312 performs a set of operations on a plurality of qubits Q1, Q2, Q3, . . . , Qn of the quantum processor 314. In an embodiment, calibration operation 312 performs a method of randomized benchmarking on the plurality of qubits. For example, calibration operation 312 can perform a set of pre-determined operations on a plurality of qubits of the quantum processor 314. The set of pre-determined operations generate a set of values for each qubit in response to performing the set of pre-determined operations. In an embodiment, calibration operator 312 compares the set of values for each qubit to an expected answer of at least one of the set of pre-determined operations.

In an embodiment, calibration operation 312 returns a set of qubit parameter values 316 for the plurality of qubits of the quantum processor 314. For example, qubit coherence time, qubit relaxation time, measurement error, and other qubit parameter values can be determined by the calibration operation. Each qubit of the quantum processor 314 can include a subset of the set of parameter values. For example, qubit Q1 can include associated parameter values P1, P2, . . . , Pn, etc. These examples of qubit parameter values are not intended to be limiting. From this disclosure, those of ordinary skill in the art will be able to conceive of many other qubit parameter values suitable for calibrating a set of qubits and the same are contemplated within the scope of the illustrative embodiments.

In an embodiment, calibration operation 312 returns a set of quantum gate parameters. For example, calibration operation 312 can return a parameter corresponding to an error rate for each quantum gate in the quantum processor 314. In an embodiment, calibration operation 312 returns a parameter corresponding to an error rate for each one and two qubit gate (primitive gate) in the quantum processor 314.

Component 308 analyzes the set of qubit parameter values 316. In an embodiment, component 308 analyzes the set of qubit parameter values 316 according to at least one of a set of qubit acceptability criteria 318. For example, component 308 can compare a parameter value of a qubit to a qubit acceptability criterion. For example, component 308 can determine a coherence time of a qubit fails to satisfy a threshold coherence time to perform a set of operations. As another example, component 308 can determine a coherence time of another qubit meets a threshold coherence time to perform the set of operations.

Component 310 analyzes a set of quantum gate parameters. In an embodiment, quantum gate parameters correspond to the set of qubits forming the quantum gate and the layout of the qubits on the quantum processor. In an embodiment, calibration operation 312 returns a set of quantum gate parameters values for a plurality of quantum gates of the quantum processor 314. For example, gate error rates, gate speeds, gate cross talk matrix, and other quantum gate parameter values can be determined by the calibration operation. Each quantum gate of the quantum processor 314 can include a subset of the set of quantum gate parameter values. These examples of quantum gate parameters are not intended to be limiting. From this disclosure, those of ordinary skill in the art will be able to conceive of many other quantum gate parameter values suitable for calibrating a set of quantum gates and the same are contemplated within the scope of the illustrative embodiments.

Component 310 analyzes the set of quantum gate parameter values. In an embodiment, component 310 analyzes the set of quantum gate parameter values according to at least one of a set of quantum gate acceptability criteria 320. For example, component 310 can compare a parameter value of a quantum gate to a quantum gate acceptability criterion. For example, component 310 can determine a gate error rate of a quantum gate fails to satisfy a threshold error rate to perform the quantum gate.

In an embodiment, component 310 generates a composite gate error rate for a composite gate from a set of primitive gate error rates, the composite gate formed from a set of primitive gates corresponding to the primitive gate error rates. In an embodiment, component 310 generates a composite gate error rate for a composite gate formed using three qubits from the formula $$\alpha = \frac{A_{123}B_{12}B_{13}B_{23}}{21}\left(\left(A_{23}B_{23}^{-1} + A_{13}B_{13}^{-1} + A_{12}B_{12}^{-1} + \frac{A_1 + A_2 + A_3}{3} + 9\right)\right),$$

where $A_{xy}$ and $B_{xy}$ are primitive gate error rates for a quantum gate formed from qubits x and y during a first calibration operation and a second calibration operation, respectively.

Figure 4:
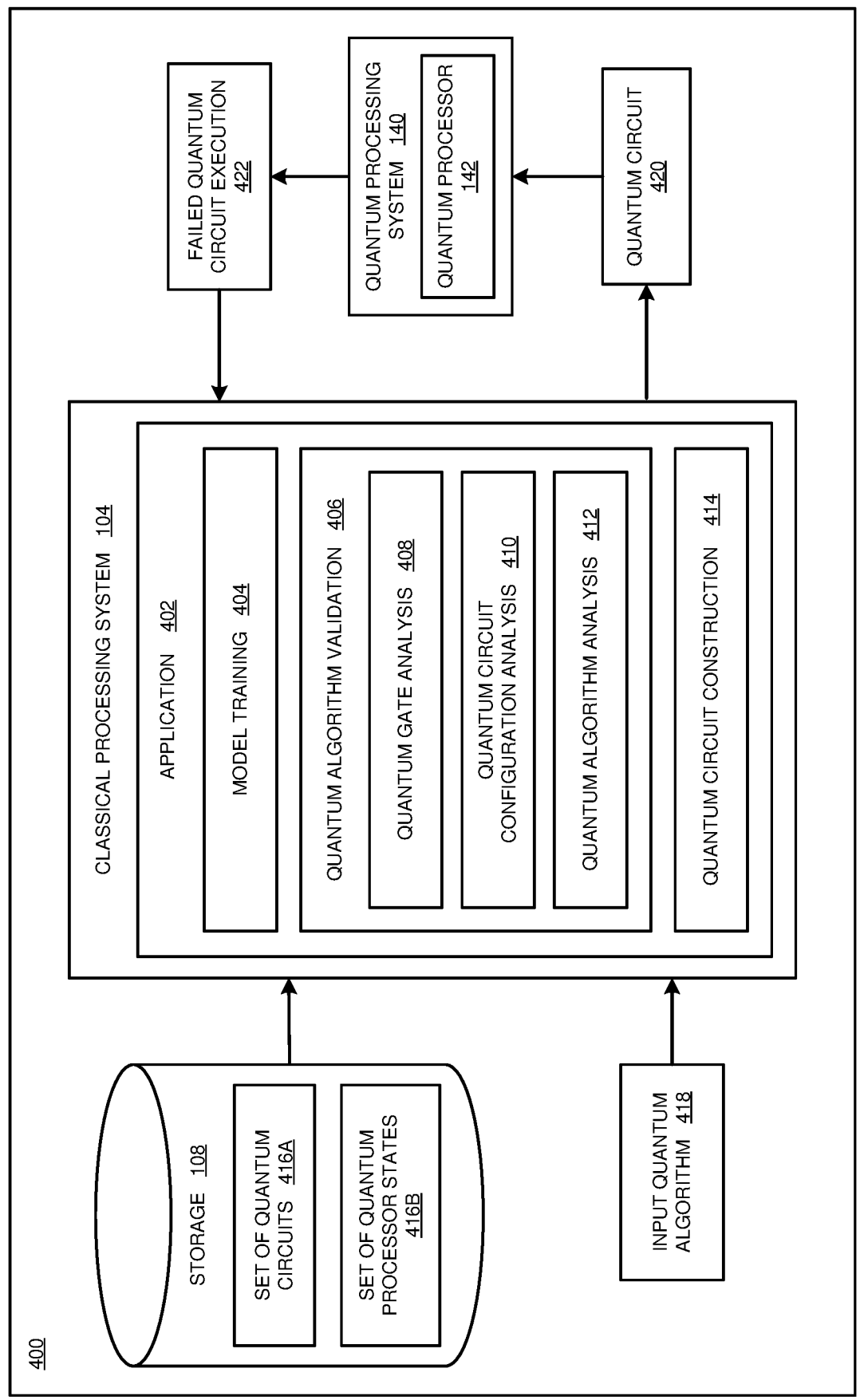
FIG. 4 depicts a block diagram of an example hybrid quantum/classical algorithm for validating quantum algorithms in accordance with an illustrative embodiment.

With reference to FIG. 4, this figure depicts a block diagram of an example hybrid quantum classical algorithm 400 for validating quantum algorithms using a classical processing system 104 and a quantum processing system 140. In an embodiment, storage 108 includes a set of quantum circuits 416A and a corresponding set of quantum processor states 416B. In an embodiment, the set of quantum circuits 416A includes a subset of quantum circuits which failed execution on a quantum processor. In an embodiment, a quantum circuit of the subset of quantum circuits includes a corresponding state of a quantum processor from the set of quantum processor states 416B.

Classical processing system 104 includes an application 402. Application 402 receives an input quantum algorithm 418, the set of quantum circuits 416A, and the set of quantum processor states 416B. In an embodiment, application 402 includes a model training component 404. Model training component 404 trains a machine learning model with the set of quantum circuits 416A and the set of quantum processor states 416B. In an embodiment, model training component 404 trains the machine learning model to generate a set of rules for validation of quantum circuits.

In an embodiment, quantum circuit construction component 414 transforms the input quantum algorithm 418 into a set of quantum circuits. A quantum circuit of the set of quantum circuits includes a set of quantum gates and a configuration of qubits on a quantum processor required to execute the quantum circuit. Quantum algorithm validation component 406 validates at least one quantum circuit of the set of quantum circuits. In an embodiment, quantum gate analysis component 408 determines a number and type of gates of the quantum circuit. In an embodiment, quantum gates analysis component 408 compares the types of quantum gates determined to a rule of the set of rules. For example, component 408 can determine the quantum circuit includes a Hadamard gate. Component 408 can compare the Hadamard gate to a rule which determines the quantum processor 142 cannot execute Hadamard gates. Component 408 can return a failed validation for the quantum circuit upon this comparison.

In an embodiment, quantum circuit configuration analysis component 410 analyzes a configuration of qubits necessary to execute the quantum circuit on a quantum processor. In an embodiment, component 410 compares a configuration of qubits necessary to a rule of the rule set corresponding to the quantum processor 142. For example, component 410 can determine two qubits on quantum processor 142 are required to interact during execution of the quantum circuit. In an embodiment, component 410 compares the configuration of qubits necessary to an available configuration of qubits on the quantum processor 142. For example, component 410 can compare the available number of qubits on the quantum processor 142 and determine not enough qubits are available for execution of the quantum circuit. Component 410 can return a failed validation for the quantum circuit upon this comparison.

In an embodiment, quantum algorithm analysis component 412 determines an estimated runtime to execute the quantum circuit. In an embodiment, component 412 compares the estimated runtime to a threshold runtime according to a rule of the set of rules. In an embodiment, component 412 fails validation of the quantum circuit if the estimated runtime exceeds the threshold runtime.

Quantum algorithm validation component 406 outputs a validated quantum circuit 420 for execution by the quantum processor 142. In an embodiment, the validated quantum circuit 420 fails execution on the quantum processor. Quantum processing system 140 returns the failed quantum circuit execution 422 to the classical processing system 104. In an embodiment, the failed quantum circuit execution 422 includes a state of the quantum processor 142, a reason for execution failure of the quantum circuit, and the corresponding quantum circuit. Component 404 receives the failed quantum circuit execution 422 and updates the set of quantum circuits 416A and the set of quantum processor states 416B with the corresponding quantum circuit and the state of the quantum processor. Component 404 can then retrain the machine learning model with the updated data set.

Figure 5:
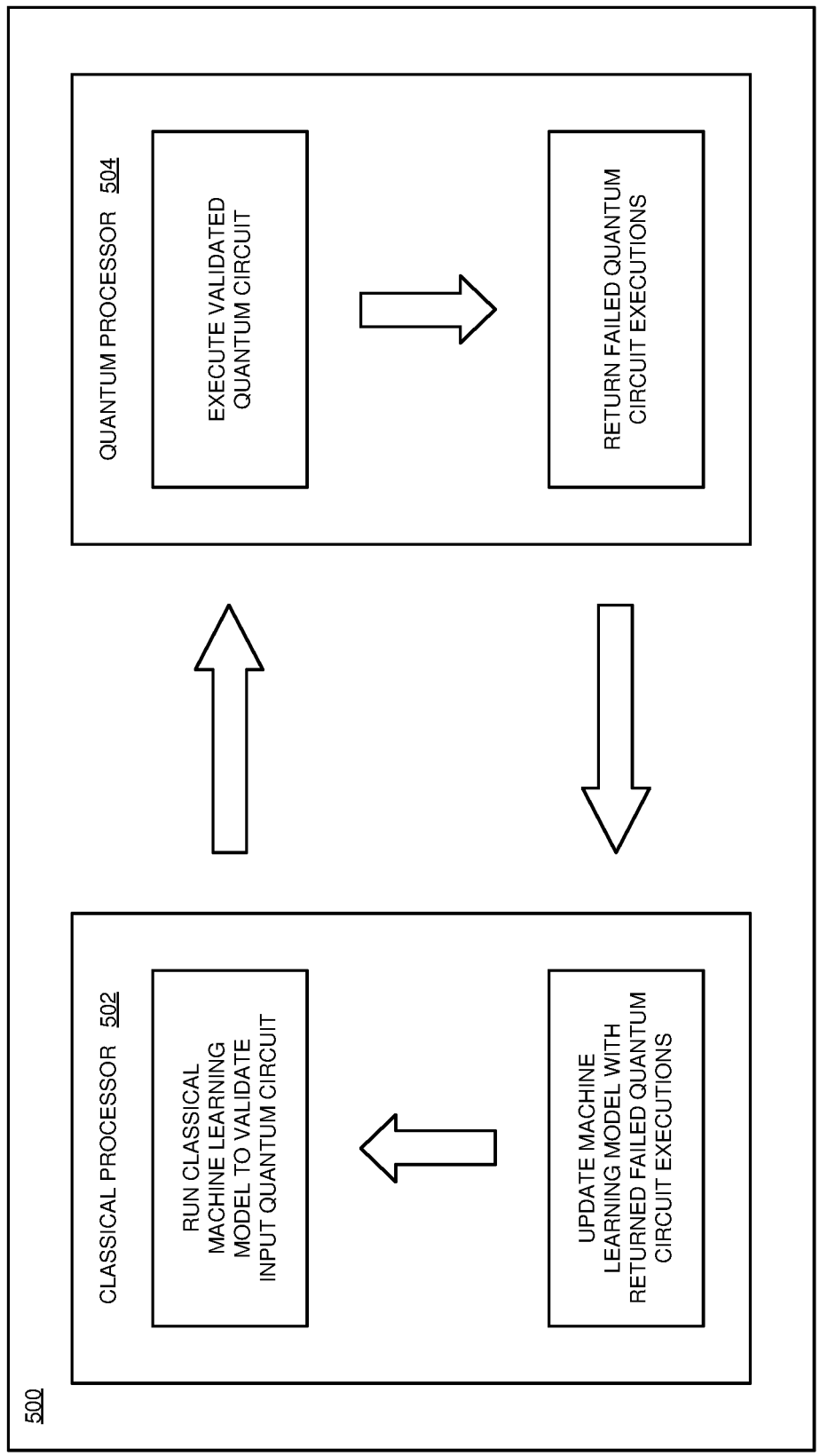
FIG. 5 depicts a block diagram of an example hybrid quantum/classical algorithm for validating quantum algorithms in accordance with an illustrative embodiment.

With reference to FIG. 5, this figure depicts a block diagram of an example hybrid quantum/classical algorithm 500 for validating quantum algorithms using a classical processor 502 and a quantum processor 504. In the example, classical processor 502 runs a classical machine learning algorithm to generate a set of rules to validate input quantum circuits, validate input quantum circuits, and send validated input quantum circuits to be executed on quantum processor 504.

Quantum processor 504 executes the validated input quantum circuit. If the execution of the validated circuit fails, quantum processor 504 returns failed quantum circuit executions, along with the state of the quantum processor, and a reason for execution failure to the classical processor 502. Classical processor 502 receives failed quantum circuit, the state of the quantum processor, and the reason for execution failure from quantum processor 304 and updates a training data set for the machine learning algorithm and retrains the machine learning model with the returned data.

Figure 6:
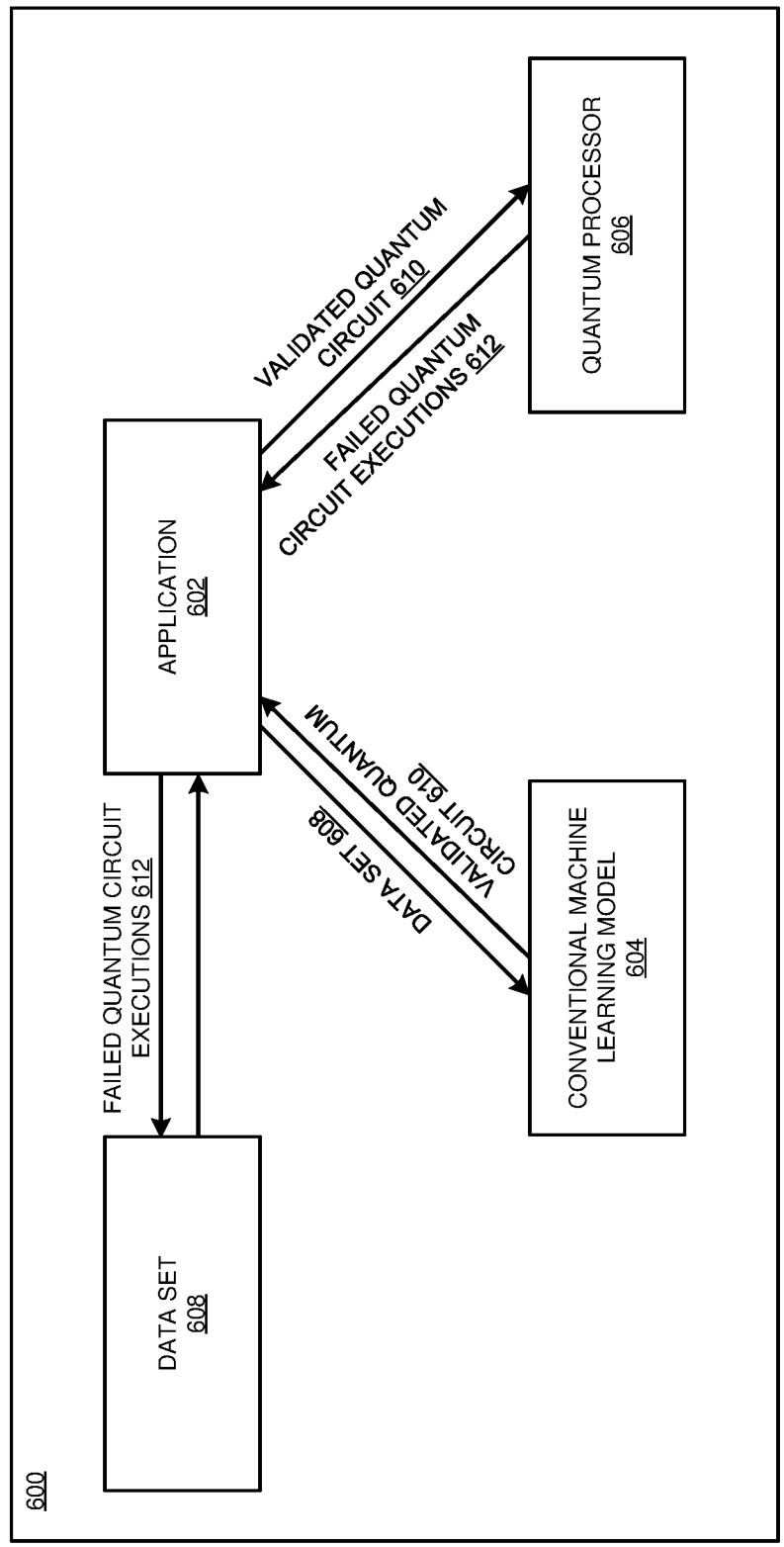
FIG. 6 depicts a block diagram of an example configuration in accordance with an illustrative embodiment.

With reference to FIG. 6, this figure depicts a block diagram of an example configuration 600 in accordance with an illustrative embodiment. The example embodiment includes an application 602. In a particular embodiment, application 602 is an example of application 105 of FIG. 1.

Application 602 receives a data set 608. In an embodiment, application 602 provides data set 608 to a conventional machine learning model 604 for training the machine learning model 604. Conventional machine learning model 604 generates a set of rules for validating input quantum circuits. Conventional machine learning model 604 also receives input quantum algorithms for validation. Conventional machine learning model constructs a set of quantum circuits corresponding to the input quantum algorithm and compares the set of quantum circuits to the set of rules to validate the set of quantum circuits. Conventional machine learning model 604 returns validated quantum circuit 610.

Application 602 receives the validated quantum circuit 610 from the conventional machine learning model 604. In an embodiment, application 602 provides the validated quantum circuit 610 to quantum processor 606 for execution of the validated quantum circuit 610 on the quantum processor 606. In an embodiment, quantum processor 606 executes the validated quantum circuit 610. In an embodiment, execution of the validated quantum circuit 610 fails. In an embodiment, quantum processor 606 returns failed quantum circuit executions 612. For example, failed quantum circuit executions 612 can include a reason for execution failure, the validated quantum circuit 610, and a state of the quantum processor 606.

In an embodiment, application 602 receives the failed quantum circuit executions 612 generated by the quantum processor 606. In an embodiment, application 602 analyzes the failed quantum circuit executions 612. In an embodiment, application 602 updates the data set 608 with the failed quantum circuit executions 612. In an embodiment, application 602 provides the conventional machine learning model 604 with the updated data set 608 for retraining the conventional machine learning model 604.

Figure 7:
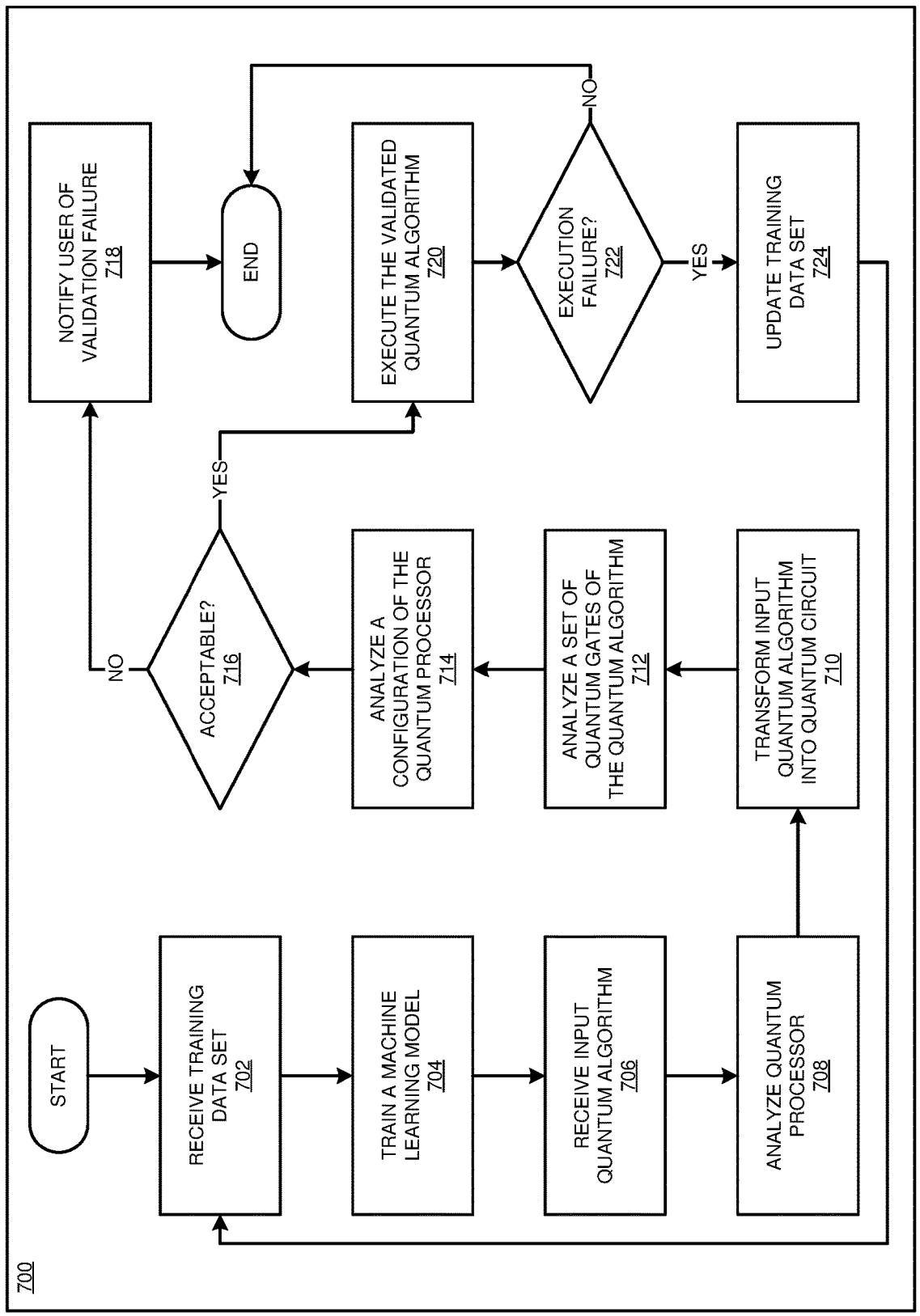
FIG. 7 depicts a flowchart of an example process for validating quantum program using a hybrid quantum/classical computing system in accordance with an illustrative embodiment.

With reference to FIG. 7, this figure depicts a flowchart of an example process 700 for validating quantum programs using a hybrid classical-quantum computing system and a machine learning model in accordance with an illustrative embodiment. In block 702, classical processor 122 receives a training data set containing a set of previously executed quantum algorithms. In an embodiment, the set of quantum algorithms contains a subset of failed execution quantum algorithms. In an embodiment, the subset of failed quantum algorithms include a corresponding state of a quantum processor when execution failed. In an embodiment, the subset of failed quantum algorithms include a corresponding reason for execution failure.

In block 704, classical processor 122 trains a machine learning model with the set of quantum algorithms. In a particular embodiment, classical processor 122 selects only the subset of failed execution quantum algorithms for training the machine learning model. In an embodiment, the machine learning model generates a set of rules for validation of quantum circuits. For example, a rule of the machine learning model can include a validation rejection of quantum circuits with a particular type of quantum gates. In another example, a rule of the machine learning model can include a validation rejection of quantum circuits which exceed a runtime threshold. In another example, a rule of the machine learning model can include a validation rejection of quantum circuits which exceed a number of qubits available for execution on the quantum processor. In yet another example, a rule of the machine learning model can include a validation rejection of quantum circuits which violate an architecture of the quantum processor 142.

In block 706, classical processor 122 receives an input quantum algorithm. In block 708, classical processor 122 analyzes quantum processor 142 and determines an initial state of the quantum processor 142. In block 710, classical processor 122 transforms the input quantum algorithm into a set of quantum circuits. In an embodiment, a quantum circuit in the set of quantum circuits includes a set of quantum gates. In block 712, classical processor 122 analyzes a set of quantum gates of the quantum circuit. In an embodiment, classical processor 122 applies a subset of the set of rules for validation of quantum circuits. In block 714, classical processor 122 analyzes a configuration of qubits on the quantum processor 142 required by the quantum circuit. For example, quantum circuit can require particular qubits of a quantum processor to interact and perform operations.

In block 716, classical processor 122 determines whether the quantum circuit is validated (acceptable). If the quantum circuit is validated (YES path of block 716), quantum processor 142 receives and executes the validated quantum circuit. In block 722, quantum processor 142 determines whether execution of the validated quantum circuit failed. If the quantum circuit executed (NO path of block 722), process 700 ends thereafter. If the quantum circuit failed execution (YES path of block 722), classical processor 122 receives the failed execution of the quantum circuit, a reason for failure of the quantum circuit, and a performs a calibration operation to determine a state of the quantum processor 142. In block 724, classical processor 724 updates the training data set and returns to block 702. If the quantum circuit fails validation (NO path of block 716), classical processor 122 notifies a user of validation failure. Process 700 ends thereafter.

Thus, a computer implemented method, system or apparatus, and computer program product are provided in the illustrative embodiments for validation of quantum circuits using a machine learning model and using a hybrid classical-quantum computing system and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
 receiving a training data set;
 training, by a first processor, a machine learning model with the training data set for validation of quantum circuits;
 generating, by the machine learning model, a set of rules for validation of quantum circuits;
 constructing a quantum circuit based on an input quantum algorithm, the quantum circuit including a set of quantum gates;
 analyzing a quantum processor to determine an initial state of the quantum processor;

17 generating a validated quantum circuit by validating, by the first processor, the quantum circuit by applying a first rule of the set of rules to the quantum circuit;
receiving data associated with an execution failure resulting from execution of the validated quantum circuit by a quantum processor;
generating updated training data by updating the training data set to include the data associated with the execution failure; and
retraining the machine learning model using the updated training data.

2. The method of claim 1, further comprising:
revalidating, by the first processor, the quantum circuit by applying a second rule of the set of rules to the quantum circuit.

3. The method of claim 2, further comprising:
executing, responsive to the validation succeeding, the quantum circuit on the quantum processor.

4. The method of claim 2, further comprising:
executing, responsive to the validation and the revalidation succeeding, the quantum circuit on the quantum processor.

5. The method of claim 4, further comprising:
updating, responsive to executing failing, the training data set with the quantum circuit.

6. The method of claim 1, wherein the first rule is a rule excluding a type of quantum gates for execution on the quantum processor.

7. The method of claim 1, wherein the first processor is a classical processor.

8. The method of claim 1, further comprising:
notifying, responsive to the validation failing, a user of a reason for failure and the quantum circuit.

9. A computer usable program product comprising one or more computer readable storage media, and program instructions stored on at least one of the one or more computer readable storage media, the stored program instructions comprising:
program instructions to receive a training data set;
program instructions to train, by a first processor, a machine learning model with the training data set for validation of quantum circuits;
program instructions to generate, by the machine learning model, a set of rules for validation of quantum circuits;
program instructions to construct a quantum circuit based on an input quantum algorithm, the quantum circuit including a set of quantum gates;
program instructions to analyze a quantum processor to determine an initial state of the quantum processor;
program instructions to generate a validated quantum circuit by validating, by the first processor, the quantum circuit by applying a first rule of the set of rules to the quantum circuit;
program instructions to receive data associated with an execution failure resulting from execution of the validated quantum circuit by a quantum processor;
program instructions to generate updated training data by updating the training data set to include the data associated with the execution failure; and
program instructions to retrain the machine learning model using the updated training data.

18

10. The computer usable program product of claim 9, further comprising:
revalidating, by the first processor, the quantum circuit by applying a second rule of the set of rules to the quantum circuit.

11. The computer usable program product of claim 10, further comprising:
executing, responsive to the validation succeeding, the quantum circuit on the quantum processor.

12. The computer usable program product of claim 10, further comprising:
executing, responsive to the validation and the revalidation succeeding, the quantum circuit on the quantum processor.

13. The computer usable program product of claim 12, further comprising:
updating, responsive to executing failing, the training data set with the quantum circuit.

14. The computer usable program product of claim 9, wherein the first rule is a rule excluding a type of quantum gates for execution on the quantum processor.

15. The computer usable program product of claim 9, wherein the first processor is a classical processor.

16. The computer usable program product of claim 9, wherein the program instructions are stored in a computer readable storage medium in a data processing system, and wherein the program instructions are transferred over a network from a remote data processing system.

17. The computer usable program product of claim 9, wherein the program instructions are stored in a computer readable storage medium in a server data processing system, and wherein the program instructions are downloaded over a network to a remote data processing system for use in a computer readable storage medium associated with the remote data processing system.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to receive a training data set;
program instructions to train, by a first processor, a machine learning model with the training data set for validation of quantum circuits;
program instructions to generate, by the machine learning model, a set of rules for validation of quantum circuits;
program instructions to construct a quantum circuit based on an input quantum algorithm, the quantum circuit including a set of quantum gates;
program instructions to analyze a quantum processor to determine an initial state of the quantum processor;
program instructions to generate a validated quantum circuit by validating, by the first processor, the quantum circuit by applying a first rule of the set of rules to the quantum circuit;
program instructions to receive data associated with an execution failure resulting from execution of the validated quantum circuit by a quantum processor;
program instructions to generate updated training data by updating the training data set to include the data associated with the execution failure; and
program instructions to retrain the machine learning model using the updated training data.

* * * * *